(12) United States Patent
Amodio et al.

(10) Patent No.: US 9,262,158 B2
(45) Date of Patent: Feb. 16, 2016

(54) REVERSE ENGINEERING USER INTERFACE MOCKUPS FROM WORKING SOFTWARE

(75) Inventors: Benjamin Amodio, Issaquah, WA (US); Siddharth Bhatia, Kirkland, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 844 days.

(21) Appl. No.: 12/966,902

(22) Filed: Dec. 13, 2010

(65) Prior Publication Data

US 2012/0151433 A1 Jun. 14, 2012

(51) Int. Cl.
*G06F 9/44* (2006.01)

(52) U.S. Cl.
CPC .. *G06F 8/74* (2013.01); *G06F 8/10* (2013.01); *G06F 8/38* (2013.01); *G06F 8/20* (2013.01); *G06F 8/30* (2013.01); *G06F 8/34* (2013.01)

(58) Field of Classification Search
CPC ............... G06F 8/10; G06F 8/20; G06F 8/24; G06F 8/30; G06F 8/34; G06F 8/36
See application file for complete search history.

(56) References Cited

U.S. PATENT DOCUMENTS

| | | | | |
|---|---|---|---|---|
| 6,748,580 | B1 * | 6/2004 | Sur et al. | 717/105 |
| 7,376,659 | B2 * | 5/2008 | Abe et al. | 707/749 |
| 8,239,882 | B2 * | 8/2012 | Dhanjal et al. | 717/117 |
| 2002/0107917 | A1 * | 8/2002 | Pociu | 709/203 |
| 2002/0170042 | A1 | 11/2002 | Do et al. | |
| 2004/0111702 | A1 | 6/2004 | Chan | |
| 2004/0236769 | A1 * | 11/2004 | Smith et al. | 707/100 |
| 2004/0268303 | A1 * | 12/2004 | Abe et al. | 717/108 |
| 2005/0071777 | A1 * | 3/2005 | Roessler et al. | 715/810 |
| 2005/0138603 | A1 | 6/2005 | Cha et al. | |
| 2005/0138606 | A1 | 6/2005 | Basu | |
| 2005/0172276 | A1 | 8/2005 | Eilebrecht | |

(Continued)

FOREIGN PATENT DOCUMENTS

CN 1851641 A 10/2006

OTHER PUBLICATIONS

Amalfitano et al., "An Iterative Approach for the Reverse Engineering of Rich Internet Application User Interfaces", 2010 IEEE, May 9, 2010, Conference Publications, Università degli Studi di Napoli Federico II Napoli, Italia, pp. 401-410; <http://ieeexplore.ieee.org/stamp/stamp.jsp?tp=&arnumber=5476509>.*

(Continued)

*Primary Examiner* — Thuy Dao
*Assistant Examiner* — Ben C Wang
(74) *Attorney, Agent, or Firm* — Kevin Sullivan; Kate Drakos; Micky Minhas

(57) ABSTRACT

The subject disclosure relates to capturing window definitions of an executing user interface application and/or website and generating an editable model representation. A starter storyboard or screens can be generated quickly by recording a manipulation of an existing application or website. States associated with a multitude of user interface control hierarchies of a target application are captured, stored in a generic user interface model, and used for generation of mockups, code, and so forth. In an aspect, an indication is received that an application or website is be captured. Thereafter, the state of the website or application window and subsequent windows are observed and captured. For each of the subsequent windows traversed in a live control hierarchy, basic information about each item is captured. The information gathered for a given window and its control hierarchy can be serialized into a simple XML representation.

18 Claims, 13 Drawing Sheets

(56) References Cited

U.S. PATENT DOCUMENTS

| | | | |
|---|---|---|---|
| 2006/0129976 A1* | 6/2006 | Brand et al. | 717/109 |
| 2008/0006379 A1* | 1/2008 | Regan et al. | 162/109 |
| 2008/0009379 A1* | 1/2008 | Steinwender | 475/5 |
| 2008/0028366 A1* | 1/2008 | Weng et al. | 717/106 |
| 2008/0148235 A1* | 6/2008 | Foresti et al. | 717/123 |
| 2008/0208918 A1* | 8/2008 | Yang et al. | 707/200 |
| 2008/0301628 A1* | 12/2008 | Lochmann | 717/107 |
| 2009/0024980 A1* | 1/2009 | Sundararajan et al. | 717/104 |
| 2009/0319958 A1* | 12/2009 | Li et al. | 715/866 |
| 2010/0050152 A1* | 2/2010 | Gilboa | 717/106 |
| 2010/0153515 A1* | 6/2010 | Lau et al. | 717/106 |
| 2010/0210333 A1* | 8/2010 | Halash | 463/9 |
| 2011/0078556 A1* | 3/2011 | Prasad et al. | 715/234 |
| 2011/0104653 A1* | 5/2011 | Rogers et al. | 434/350 |
| 2011/0119603 A1* | 5/2011 | Peltz et al. | 715/762 |
| 2012/0124495 A1* | 5/2012 | Amichai et al. | 715/762 |
| 2012/0179430 A1* | 7/2012 | Aish et al. | 703/1 |
| 2012/0179987 A1* | 7/2012 | Mohan et al. | 715/762 |
| 2012/0198457 A1* | 8/2012 | Leonelli et al. | 718/102 |
| 2012/0233583 A1* | 9/2012 | Horovitz | 717/100 |
| 2013/0219307 A1* | 8/2013 | Raber et al. | 715/763 |
| 2014/0075371 A1* | 3/2014 | Carmi | 715/781 |
| 2014/0115506 A1* | 4/2014 | George et al. | 715/764 |

OTHER PUBLICATIONS

Grilo et al., "Reverse Engineering of GUI Models for Testing", Jun. 16-19, 2010, IEEE, 2010 CISTI, pp. 1-6; <http://ieeexplore.ieee.org/xpls/abs_all.jsp?arnumber=5556690&tag=1>.*

Morgado et al., "Reverse Engineering of Graphical User Interfaces", IARIA, Oct. 23-29, 2011, pp. 293-298; <http://www.thinkmind.org/download.php?articleid=icsea_2011_12_40_10240>.*

Silva et al., "Combining static and dynamic analysis for the reverse engineering of web applications", ACM, EICS'13, Jun. 24-27, 2013, pp. 107-112; <http://dl.acm.org/citation.cfm?id=2480324>.*

Morgado et al., GUI Reverse Engineering with Machine Learning, Jun. 5, 2012 IEEE, pp. 27-31; <http://ieeexplorejeee.org/stamp/stamp.jsp?tp=&arnumber=6227966>.*

Di Lucca et al., "Reverse Engineering Web Application—the WARE Approach", Jan. 29, 2004, John Wiley & Sons, Ltd., vol. 16, Issue 1-2, pp. 71-101; <http://web.soccerlab.polymtl.ca/log6305/protected/papers/dilucca-ware.pdf>.*

Porfirio Tramontana, "Reverse Engineering Web Applications", ICSM'05, Sep. 26-29, 2005 IEEE, pp. 1-4; <http://ieeexplore.ieee.org/stamp/stamp.jsp?arnumber=1510178>.*

Paganelli et al., "Automatic Reconstruction of the Underlying Interaction Design of Web Applications", SEKE '02, Jul. 15-19, 2002 ACM, pp. 439-445; <http://dl.acm.org/results.cfm?h=1&cfid=546834172&cftoken=24143026>.*

H. Samir "Automated Reverse Engineering of Java Graphical User Interfaces for Web Migration", Published Date: Dec. 16-18, 2007; 6 pages.

Atif Memon, et al., GUI Ripping: Reverse Engineering of Graphical User Interfaces for Testing, Published Date: Nov. 13-16, 2003; 20 Pages.

E. Merlo, et al. "Reverse Engineering of User Interfaces", Published Date: May 21-23, 1993, 9 Pages.

Abdu R. Elwahidi, et al. Generating User Interfaces from Specifications Produced by a Reverse Engineering Process, Published Date: Jul. 14-16, 1995, 7 Pages.

Joao Carlos Silva, et al. "Models for the Reverse Engineering of Java/Swing Applications", Published Date: Oct. 2006, 8 Pages.

"Balsamiq Mockups", Published Date: Oct. 21, 2010; 4 Pages; http://balsamiq.com/products/mockups.

E. Stroulia, et al. "User Interface Reverse Engineering in Support of Migration to the Web", Published Date: Apr. 19, 2004, 28 Pages.

"International Search Report", Mailed Date: Jul. 31, 2012, Application No. PCT/US2011/064508, filed date: Dec. 13, 2011, pp. 8.

"First Office Action and Search Report Received in China Patent Application No. 201110435569.7", Mailed Date: Oct. 23, 2013, filed date: Dec. 12, 20114, 15 Pages.

"Second Office Action Received in China Patent Application No. 201110435569.7", Mailed Date: Apr. 8, 2014, filed date: Dec. 12, 20114, 14 Pages.

"Supplementary Search Report Received for European Patent Application No. 11849722.1", Mailed Date: Apr. 29, 2014, 7 Pages.

"Office Action Received for Chinese Patent Application No. 201110435569.7", Mailed Date: Jan. 14, 2015, 10 Pages.

"Third Office Action Received for Chinese Patent Application No. 201110435569.7", Mailed Date: Aug. 19, 2014, 7 Pages.

"Fourth Office Action Received for Chinese Patent Application No. 201110435569.7", Mailed Date: Jul. 10, 2015, 6 Pages.

Vanderdonckt, et al., "Flexible Reverse Engineering of Web Pages with VAQUISTA", In Proceedings of Eighth Working Conference on Reverse Engineering, Oct. 2, 2001, pp. 241-248.

* cited by examiner

REVERSE ENGINEERING USER INTERFACE MOCKUPS FROM WORKING SOFTWARE

TECHNICAL FIELD

The subject disclosure generally relates to creating mockups of user interface applications by modeling the state of control hierarchies; by modeling flow, navigation, and linking across screens; and by using the modeling for generating a target application model.

BACKGROUND

As computing technology advances and computing devices become more prevalent, computer programming techniques have adapted for the wide variety of computing devices in use. For instance, program code can be generated according to various programming languages to control computing devices ranging in size and capability from relatively constrained devices such as simple embedded systems, mobile handsets, and the like, to large, high-performance computing entities such as data centers or server clusters.

Conventionally, as applications are being developed and/or modified for use with computing devices, a new user interface or website interface might be created without reference to an existing interface. However, it is more common to utilize an existing interface and apply modifications to that interface. Therefore, a mockup or model representation is created and can be used to obtain feedback from others involved in the development process.

When analysts work on enhancements of an existing application, they have to recreate the existing application screens manually in a mockup tool in order to be able to modify the screens as part of their desired specifications. Creation of mockups is time consuming and often results in mockups that are not adequate for some purposes. For example, mockups created manually can take anywhere from ten minutes to thirty minutes or longer to create.

In some cases, a screen shot might be captured in an attempt to create a mockup. However, screen shots are not well suited to the purpose of mockups, which is to convey the intent of the application or interface as well as the interaction of elements contained therein. For instance, if the right hand side of the screen shot is being changed, that portion is deleted and replaced by recreated shapes that might no longer match the full screen shot. This can create a disconnect between the screen shot portion and the hand drawn portion. For example, the screen shot portion might be in color and the recreated portion in black and white, which can be distracting. Further, the quality or granularity of the two portions might not be the same. This can result in more focus being placed on the trivial details (e.g., pixels, color, and so on) and not on the overall concept and intent of the mockup or model representation.

Consequently, it would be desirable to have the ability to quickly create mockups or model representations for existing applications and/or websites. It would also be desirable to create a mockup of an existing user interface that has a consistent amount of granularity. As another example, it would be beneficial to have a mockup created in a digital and easily consumable format to allow the mockup to be easily shared and manipulated.

Conventionally, various solutions have been proposed for creating user interface mockups. However, none of the solutions proposed for creating mockups has addressed all of the above requirements and such a solution would be desirable to significantly improve efficiency of creating user interface mockups.

The above-described deficiencies of today's computing system and mockup creation system techniques are merely intended to provide an overview of some of the problems of conventional systems, and are not intended to be exhaustive. Other problems with conventional systems and corresponding benefits of the various non-limiting embodiments described herein may become further apparent upon review of the following description.

SUMMARY

A simplified summary is provided herein to help enable a basic or general understanding of various aspects of exemplary, non-limiting embodiments that follow in the more detailed description and the accompanying drawings. This summary is not intended, however, as an extensive or exhaustive overview. Instead, the sole purpose of this summary is to present some concepts related to some exemplary non-limiting embodiments in a simplified form as a prelude to the more detailed description of the various embodiments that follow.

In one or more embodiments, a reverse engineering mockup system automatically captures the window definitions of a running user interface application and generates an editable user interface mockup. This approach has various benefits, which include simplicity and speed of creating a mockup. The one or more embodiments can also record and reverse engineer the flow between multiple screens of the running user interface application. Further, based on the flow, links between the screens can be generated to represent navigation and interactivity for a given scenario. Thus, mockups for existing user interfaces do not need to be recreated when designing a new feature request, according to an aspect. To facilitate capture of the window definitions, accessibility application programming interfaces (APIs) can be utilized, in accordance with some aspects.

In some embodiments, the reverse engineering mockup system is able to capture and interpret the "definition" of a rendered control hierarchy and can store this representation in a model of the user interface. This provides functionality such as re-rendering the screen in a low fidelity "sketchy" (or hand-drawn) theme, which is a highly desirable feature for a mockup application (e.g., takes the focus away from trivial details). The captured metadata can also be utilized to generate starter application code (e.g., Extensible Application Markup Language (XAML), HyperText Markup Language (HTML), and so forth), which is valuable for migrating user interface applications across technologies and/or re-implementing an existing application.

These and other embodiments are described in more detail below.

BRIEF DESCRIPTION OF THE DRAWINGS

Various non-limiting embodiments are further described with reference to the accompanying drawings in which.

DETAILED DESCRIPTION

Overview

Figure 1:
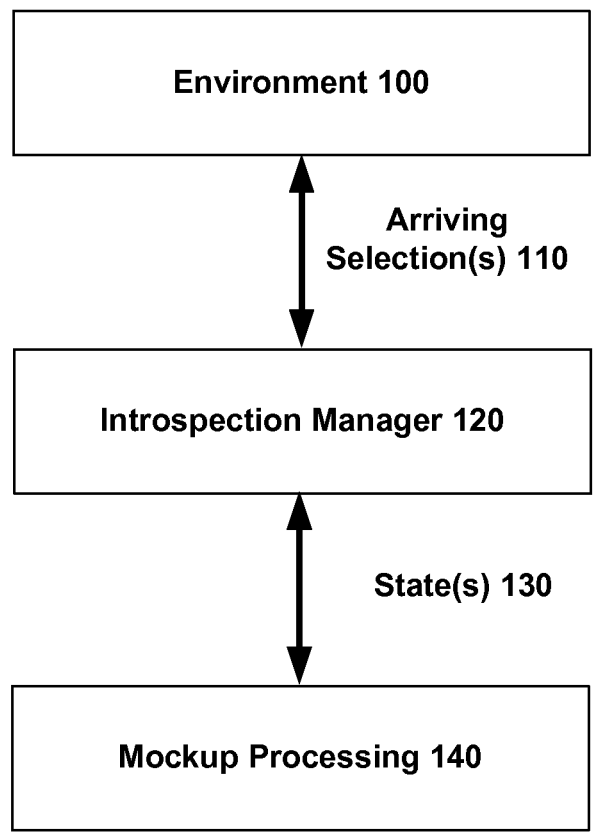
FIG. 1 is a block diagram showing a simplified reverse engineering mockup system in accordance with one or more embodiments.

When a designer desires to change an application, website, and/or one or more interface windows associated with the application or website, mockups are created through storyboarding or wireframing. There are at least three attributes associated with successful mockup creation. The first attribute is simplicity of creating the mockup. For instance, it would be beneficial to allow someone with little or no knowledge of mockup creation to create a useful mockup. The second attribute is the speed of mockup creation in order for mockups to be valuable and useful tools. Therefore, it is desirable to mitigate the amount of time it takes to create the mockup so that the benefits outweigh the costs. Another attribute is the availability of control libraries and it is desirable to leverage these control libraries to create the mockups.

Thus, it would be beneficial to allow creation of a mockup of an existing user interface of an application and/or website with a limited number of selections (or clicks) or with a single selection. As disclosed herein, the mockup can be created by capturing shapes and converting the shapes to a raw format that is editable. Thus, instead of capturing pixels by taking a screenshot, the concept of a tree or the concept of a check box can be captured. Also captured can be the approximate size and coordinates of the elements and/or controls within the interface windows. Thus, the type of control, the state of the control, and/or layout information for the interface is obtained in order to capture a user interface efficiently. The type of control provides information related to the control and/or element (e.g., the control is a check box, the control is a text box, the element is an image, and so on). Also provided can be the state of the control that is specific to the control (e.g., whether the check box is checked or is not checked). The layout information captured can be the positioning and the size of the element and/or control.

In one embodiment, a reverse engineering mockup system includes an introspection manager component configured to capture a plurality of states associated with a plurality of user interface (UI) control hierarchies of a target application. The reverse engineering mockup system also includes a mockup processing component configured to generate a model representation based on the plurality of states and an output component configured to render the model representation in an editable format.

The system, in another example, further includes a gesture component configured to receive a selection of a target application and an observation component configured to obtain a first state of a first window of the target application and a second state of a second window. The second window can be activated or materialized as a result of triggering of an action in the first window or as a control hierarchy. The system also includes a storyboard manager component configured to access the plurality of UI control hierarchies and associated information. The mockup processing component is further configured to serialize the plurality of UI control hierarchies and associated information into the model representation.

In another example, the system further includes a converter component configured to convert the model representation into a format compatible with the target application. The output component is further configured to convey the model representation in the format compatible with the target application for use as a mockup.

In further examples, the introspection manager component is further configured to capture a control (e.g., checkbox) concept, wherein the control concept is associated with one of the plurality of states.

In some examples, the mockup processing component is further configured to retain the model representation as an intermediate model for later conversion into a format compatible with the target application or with different, multiple target applications.

The system, in some examples, further includes a gesture component configured to identify a selection of the target application as a function of a gesture that identifies the target application and a first application window of the target application.

In further examples, the system further includes a tracking component configured to monitor a flow between a plurality of screens of the target application and a navigation component configured to generate links that represent the flow between the plurality of screens.

In an example, the introspection manager component is further configured to capture at least one of a type of an application, a bound of the application, a state of a control or its child controls. In other examples, the introspection manager component utilizes an accessibility application programming interface.

In another embodiment, a method for creating a model of a user interface includes identifying an application within the user interface, recording a first set of data representative of a state of a first window of the application, inputting the first set of data into a model, and outputting the model in a consumable format.

In an example, the identifying includes receiving a selection of the application and the first window and determining a reference for the first window, wherein the first window and the application are currently executing within the user interface.

In another example, the recording includes recording at least one of a type, a bound, a state of a control or its child controls. In still another example, the recording comprises utilizing accessibility application programming interfaces to capture information related to the first set of data.

The method, in another example, can further include capturing a second set of data representative of a transition from the first window to at least a second window and applying the second set of data to the model, wherein the outputting comprises outputting the model that comprises the first set of data and the second set of data in the consumable format.

In a further example, the method includes capturing a second set of data representative of a flow from the first window to at least a second window, obtaining a third set of data representative of the state of at least the second window, and inputting the first set of data, the second set of data, and the third set of data into the model before the outputting.

In still another example, the method further includes creating a navigation that details a movement from the first window to a subsequent window and retaining a first state for the first window and a second state for the subsequent window. The method also includes sending the first state and the second state to the model, wherein the first state and the second state are output in a format compatible with a target application.

In another example, the method includes generating an intermediate model using the first set of data before the outputting. In yet another example, the outputting includes mapping the model to a target application model, generating the target application model, and rending the target application model as the mockup of an existing application.

In another example, the outputting comprises outputting the model in a modifiable and consumable digital format.

In another embodiment, a method for reverse engineering a user interface mockup includes received a selection of an executing user interface window of an application or a website for which a mockup is to be created and capturing interaction details of a progression from the executing user interface window to a subsequent interface window. A plurality of intermediate windows are accessed during the progression from the running user interface window to the child interface window. The method also includes recording a plurality of states, wherein the plurality of states comprise a state for each of the executing user interface window, the subsequent interface window, and the plurality of intermediate windows. Further, the method includes means for generating a model that comprises the interaction details and the plurality of states, mapping the model to a target application model, and rending the target application model as a modifiable mockup for a modified version of the application or the website.

Herein, an overview of some of the embodiments for reverse engineering user interface mockups from working software has been presented above. As a roadmap for what follows next, various exemplary, non-limiting embodiments and features for reverse engineering user interface mockups are described in more detail. Then, some non-limiting implementations and examples are given for additional illustration, followed by representative network and computing environments in which such embodiments and/or features can be implemented.

Reverse Engineering User Interface Mockups from Working Software

By way of further description with respect to one or more non-limiting ways to create model representations though reverse engineering, a block diagram of an exemplary computing system is illustrated generally by FIG. 1. The computing system includes an environment 100, which can be a graphical user interface, a desktop application, a web-based application, or another programming platform. The environment 100 can include a target application for which a model representation or mockup is to be created. For instance, a user can provide a gesture or other input (e.g., voice command, text command, and so forth) that indicates the target application is to be captured. The gesture can be provided as input in the form of one or more arriving selections 110. An introspection manager component 120 is configured to receive the one or more arriving selections 110 and capture a multitude of states (e.g., the window and all the subcomponents inside the window) of multiple user interface control hierarchies (e.g., one control hierarchy per window) of the target application. For example, a first window can launch a second window, which launches a subsequent window. In another example, a user, interacting with a first window, can navigate to a second window and, through interaction with the second window (or the first window) can navigate to a third window, and so forth.

The introspection manager component 120 conveys the multitude of states 130 to a mockup processing component 140 that is configured to generate a model representation based, in part, on the multitude of states. For instance, the mockup processing component 140 can generate the model representation in a generic user interface model. The model representation can be output to the user in any perceivable format for generating mockups, code, and so forth. For instance, the model representation can be rendered on a user device in an editable and openly consumable format (e.g., the user and/or others can read it and consume it). In an example, the model representation can be output in digital format. In an embodiment, the module representation is output at about the same time (e.g., in real-time) as the multitude of states are captured or at a different time (e.g., stored for later consumption). In some embodiments, the mockup processing component 140 is further configured to retain the model representation as an intermediate model for later use as a mockup or for other purposes. For example, the intermediate model is generic and, therefore, can be standardized and multiple applications, third parties, and so forth can consume the intermediate model.

In some embodiments, the introspection manager component 120 is further configured to capture a type of application, a bound of the application, a state of a control or its child controls, or combinations thereof. For example, child control information can include the state of a given control hierarchy (e.g., a window and all of its subcomponents inside the window).

In accordance with some embodiments, the introspection manager component 120 utilizes an accessibility application programming interface to capture the multitude of states. For example, the accessibility application programming interface can be a user interface automation, a Hypertext Markup Language Document Object Model (HTML DOM), or another type of accessibility application programming interface. In an embodiment, the introspection manager component 120, though identification of the application or window, obtains a handle to the application or window. The obtained handle allows for the use of at least some of the control libraries that are available and from which information from the running application can be extracted.

In an embodiment, the reverse engineering mockup system illustrated by FIG. 1 can differ in operation from a conventional mockup construction system in order to provide additional benefits over those achievable by computing systems that employ conventional mockup construction systems. For instance, the reverse engineering mockup system disclosed herein is able to quickly generate a starter storyboard or screen by simply recording a manipulation of an existing application. The storyboard is a potential output artifact although other means of outputting the mockup or model representation can also be utilized. The disclosed aspects have the benefit of mitigating an amount of screen authoring time from, for example, ten minutes (or more) per screen to, for example, less than about one minute per screen. Another benefit of the disclosed aspects is the ability to create the starter storyboard or screen in a simplified manner. A further benefit of the disclosed aspects is the utilization of control libraries in order to extract information associated with the running application.

Figure 2:
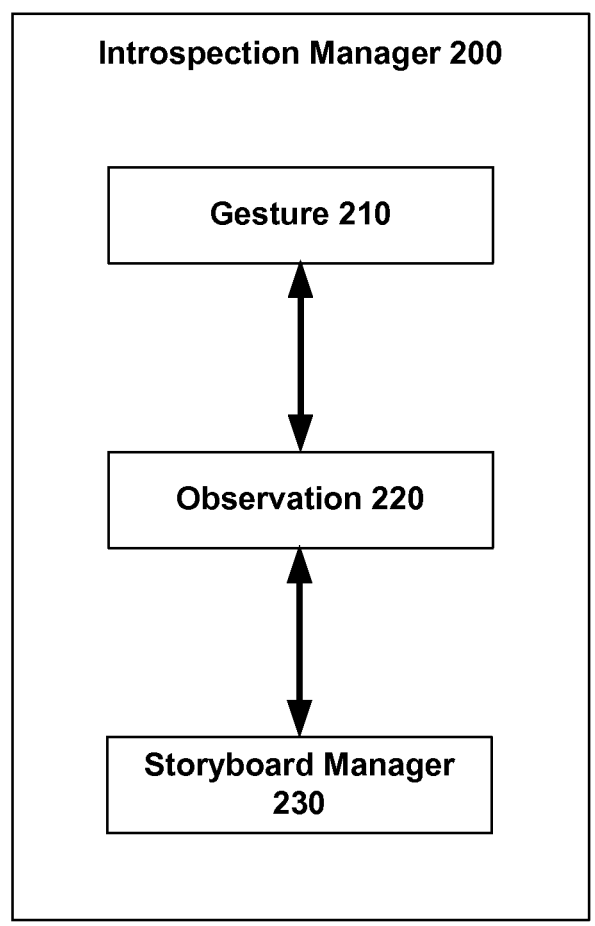
FIG. 2 is a block diagram showing exemplary functions of an introspection manager component in accordance with one or more embodiments.

Illustrating other aspects, FIG. 2 is a block diagram showing an introspection manager component 200 containing a gesture component 210, an observation component 220, and a storyboard manager component 230. In one embodiment, gesture component 210 is configured to receive a selection of a target application. In an example, the gesture component 210 is configured to obtain a selection of an executing user interface window for which a mockup or other model representation is to be created. In some embodiments, the gesture component 210 is configured to identify a selection of a target application as a function of a gesture that identifies the target application and a first application window of the target application. For example, gesture component 210 can be configured to monitor a keyboard, a mouse, or another device though which a user can interact with a reverse engineering mockup system. In accordance with some aspects, gesture component 210 receives a verbal command, a text command, or some other input that indicates that a model representation should be created and identifies the interface(s) that should be captured.

Figure 3:
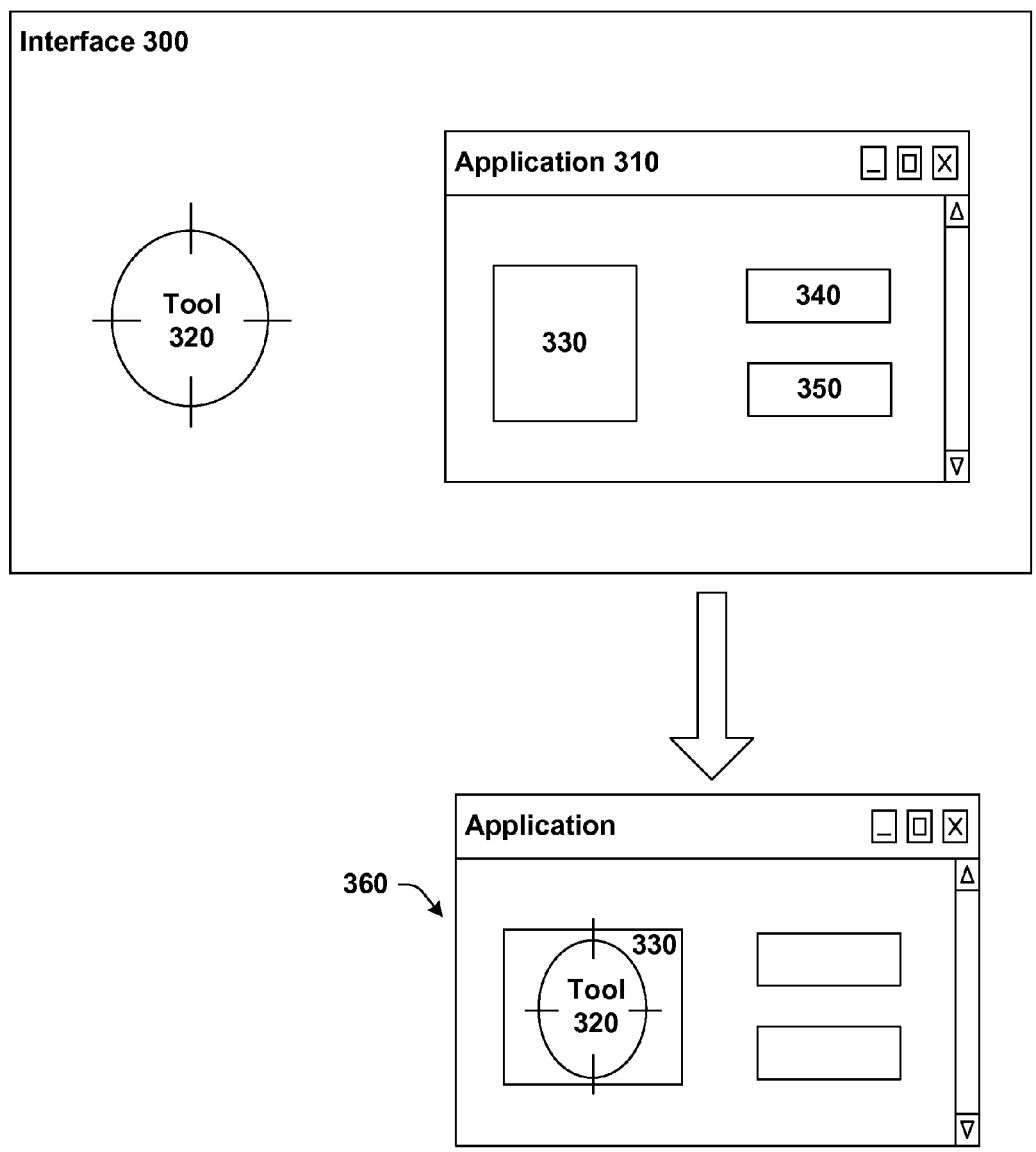
FIG. 3 is a block diagram of an interface in accordance with one or more embodiments.

For example, as illustrated by the interface 300 of FIG. 3, when a user wants to modify an application 310, the user causes the application 310 to execute and display. The user can also cause a tool 320 associated with the introspection manager to display. The application 310 and the tool 320 can be positioned side-by-side on the display. In some examples, the application 310 and tool 320 can have a different orientation with respect to each other.

To select the application 310, the user can select the tool 320 (e.g., with a pointer device such as a mouse) and drag the tool 320 over the application 310 (or over a first window of the application). In some embodiments, the tool 320 has a crosshair or other feature that allows the user to pinpoint a location within the application, such as one or more of elements or controls 330, 340, and 350. Selection of element 330 by placing the tool 320 over the element 330 is shown at 360. In accordance with some aspects, the selection is performed through other means (e.g., manipulation of a drop-down menu, verbal command, and so forth).

With reference again to FIG. 2, based on the received gesture that indicates the application currently executing is to be captured, the observation component 220 is configured to obtain a window definition or a first state of a first window (e.g., the window executing when the input is received by gesture component 210) of the target application. In accordance with some aspects, the observation component 220 is configured to interact with one or more accessibility application programming interfaces (APIs) to obtain the states. For example, the one or more APIs can access one or more control libraries and, therefore, can provide very granular information related to the states.

The first window might launch or interact with one or more other windows, such as a control hierarchy or by the user drilling down into the application (e.g., movement from a first screen to a second screen (or subsequent screens).

The observation component 220 is configured to obtain a second state that represents the second window. In another example, the user might traverse from the first interface window, through a multitude of intermediate interface windows, to a subsequent interface window. In this case, observation component 220 is configured to record a plurality of states, wherein the plurality of states comprises a state for each of an executing user interface window (e.g., the window initially selected), the subsequent interface window, and the plurality of intermediate interface windows.

For each new window that is discovered (or opened by (or through) the preceding window), a storyboard manager component 230 is configured to acquire the control hierarchy and associated information for each window. For example, as the application traverses its control hierarchy, storyboard manager component 230 is configured to capture basic information about each item in the hierarchy. Such basic information can comprise control type, dimensions, coordinates, state information depending on control type, and so forth.

Figure 4:
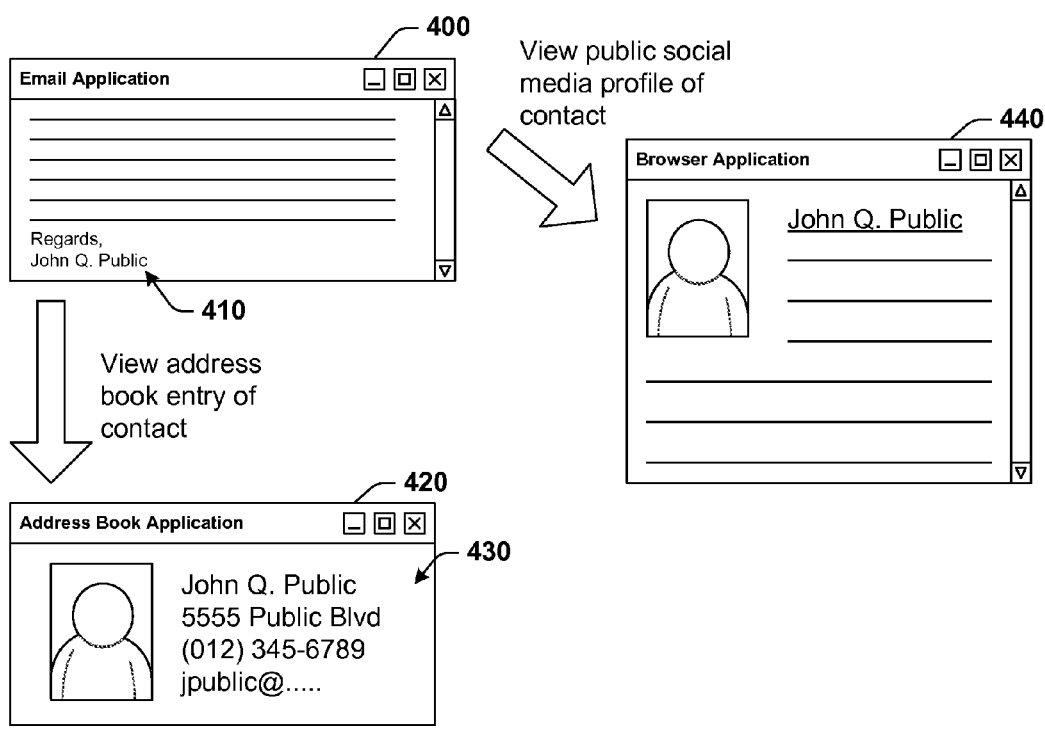
FIG. 4 is a non-limiting illustration of capturing states originating in one application and terminating in a plurality of applications in accordance with one or more embodiments.

For example, FIG. 4 shows a non-limiting illustration of capturing states originating in one application and terminating in a plurality of applications. As illustrated, a first window 400 of an application (such as an email application) is opened. The first window 400 might include a link, such as contact link 410, that can launch another window. When the user selects or clicks on the contact link 410, first window 400 launches a second window 420, such as the address book application that includes an address book entry 430. After viewing the address book entry 430 the user might close second window 420 and return to first window 400. If the user desires to view a public social media profile of the contact link 410, the user makes the selection in first window 400, wherein a third window 440, such as browser application, is launched. After viewing the desired information, the user closes the third window 440, thus returning to first window 400. However, in accordance with some aspects, the windows are open in serial fashion such that each window opens another window in succession.

Figure 5:
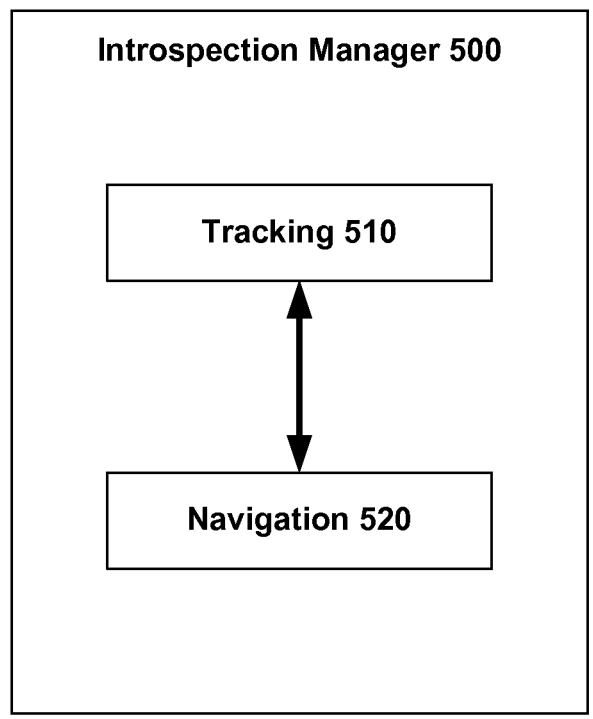
FIG. 5 a block diagram showing further exemplary functions of an introspection manager in accordance with one or more embodiments.

Illustrating further aspects, FIG. 5 is a block diagram showing another embodiment of an introspection manager 500 containing a tracking component 510 and a navigation component 520. In one embodiment, the tracking component 510 is configured to monitor a flow between a plurality of screens of the target application. For example, the tracking component 510 can identify a transition between screens and/or can identify when a new screen is launched and displayed. In another example, the target application can be selected and a first screen of the target application can be executing. As the user causes introspection manager 500 to move around within the application and as subsequent screens are opened (e.g., the first screen launches or interacts with a second screen and so forth) tracking component 510 monitors the flow or the navigation (e.g., what occurred to cause each subsequent window to open). In another example, tracking component 510 is configured to capture details related to a progression from a running user interface window to a subsequent interface window, wherein a plurality of intermediate windows are accessed during the progression from the executing user interface window to the subsequent user interface window.

The navigation component 520 is configured to generate links that represent the flow or interactivity between the plurality of screens. The links can include the details related to what caused the next or subsequent screen to execute (e.g., manual, automatically). For example, as the user consumes information on a first screen, the user might desire to open a second screen and/or launch a website. Navigation component 520 is configured to capture the user input (e.g., selection of a link in a website, selecting a next button, and so forth). In such a manner, when the mockup is created, the links between the plurality of screens can be provided in addition to the metadata associated with the state of the application and/or each window within the application.

Figure 6:
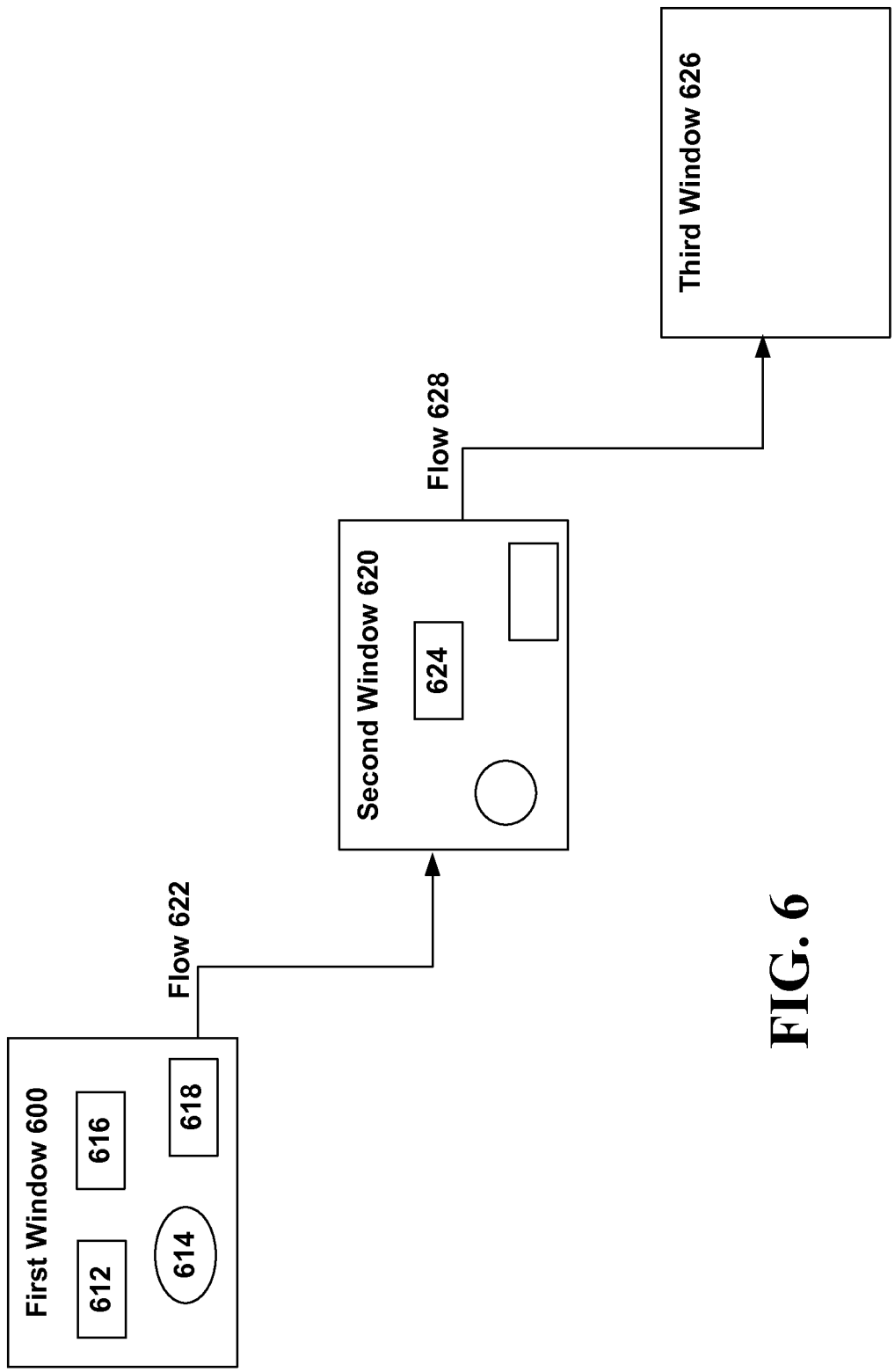
FIG. 6 is an illustration of a non-limiting flow between applications, websites, or other interfaces in accordance with one or more embodiments.

A non-limiting illustration of a flow between applications, websites, or other interfaces is shown in FIG. 6. As shown, a first window of an application is selected and at least one state of the first window 600 is captured to create a model representation. For example, the state of the first window 600 can comprise information related to each control or element 612, 614, 616, 618 included in the first window 600. In some examples, the concept of the control or element is captured rather than detailed information (e.g., number of pixels, color, and so forth) of the control or element. In an example, the concept can include the type of control or element (e.g., box, circle, check box, text box, image, link, and so forth). In another example, the concept can include layout information, such as the positioning within the window and/or the size of the element or control. In other examples, the concept includes both the type and the layout information.

The user might select a next button 618 and, based on that selection, first window 600 launches a second window 620. The flow 622 from the first window 600 to the second window 620 can be gathered and included in the mockup or model representation that is created. Further, the user can select a next button 624 in the second window 620, which launches a third window 626. A second flow 628, from second window 620 to third window 626 can be captured as a portion of the model representation.

Figure 7:
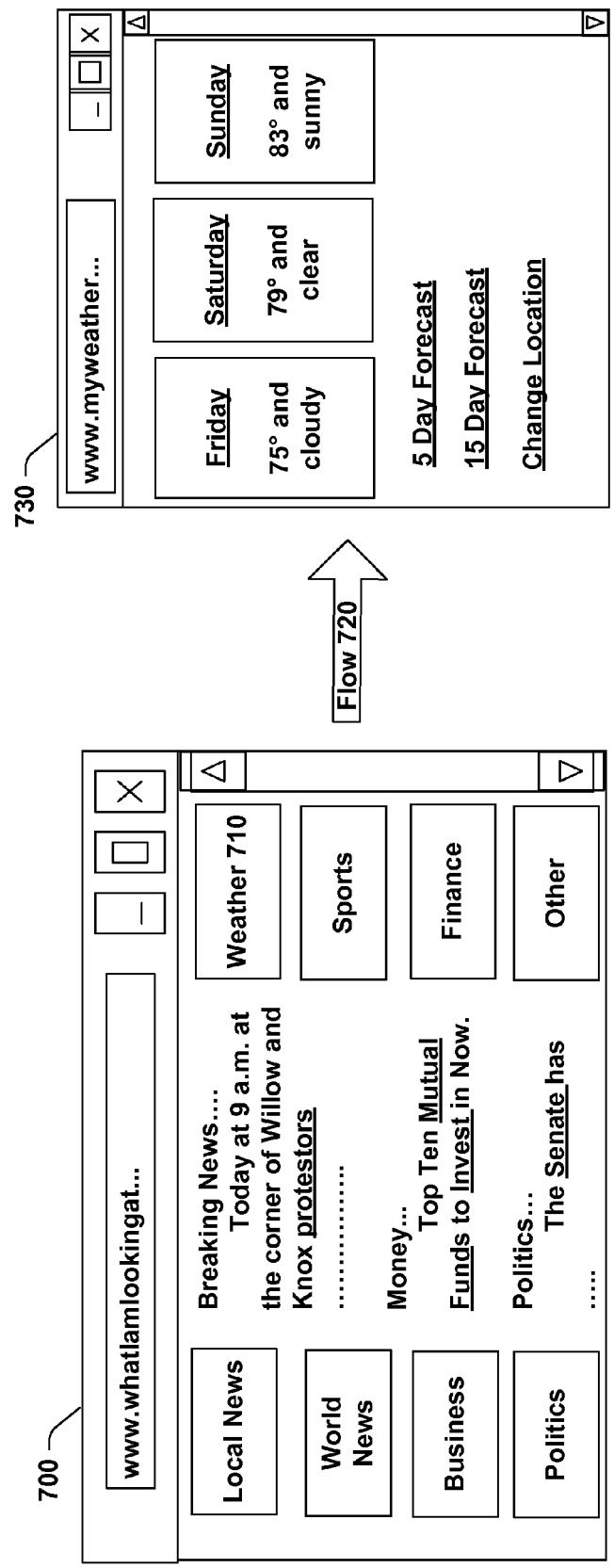
FIG. 7 is an illustration of a flow between websites interfaces in accordance with one or more embodiments.

A non-limiting illustration of a flow between websites interfaces is shown in FIG. 7. A first website 700, such as a news website can present various links (e.g., local news, world news, business, politics, weather, sports, finance, and so forth) that a user can select to drill down into each type of news, depending on the interests of the user. Further, there can be other links within the website, which are generally identified by underlining. When the user selects a link, such as a weather link 710, a flow 720 from the first website 700 to a second website 730 is captured. In this example, the second website 730 is a weather website, which provides links to subsequent websites, wherein each link to a subsequent website can be gathered and input into a model representation.

Figure 8:
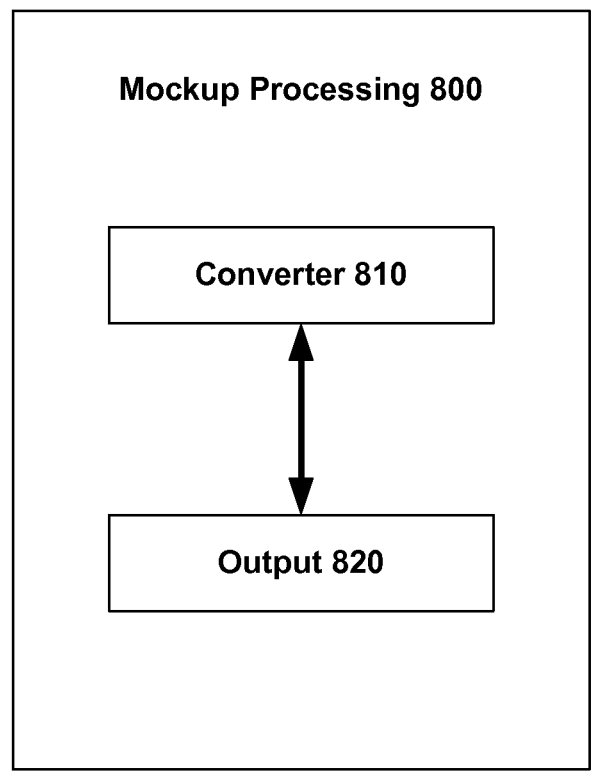
FIG. 8 is a block diagram showing exemplary functions of a mockup processing component in accordance with one or more embodiments.

Illustrating other aspects, FIG. 8 is a block diagram showing a mockup processing component 800 containing a converter component 810 and an output component 820. In one embodiment, mockup processing component 800 is configured to serialize control hierarchy and associated information into the model representation. For example, the control hierarchy and association information can be serialized into a simple Extensible Markup Language (XML) representation.

After recording and capturing of the application is completed, the converter component 810 is configured to interpret the model representation and convert it into another concrete representation. For instance, the converter component 810 is configured to convert the model representation into a format compatible with one or more target applications. In an example, the target application can be a sketchy representation, XAML, HTML, and so forth. The output component 820 is configured to convey the model representation in a format compatible with the target application for use as a mockup or other target application model. In some embodiments, a shape, for example, is captured and converter component 810 converts the shape to a raw format that is editable. The editable raw format is presented to the user by output component 820. In an example, output component 820 can render the target application model as a modifiable and/or consumable mockup for an application.

According to a non-limiting example, if the target application is a presentation program, converter component 810 can generate slides with shapes, wherein the slides are rendered by output component 820. Further, if interactions between windows are captured, each interaction can be represented on a slide at the appropriate location within the presentation.

In another non-limiting example, if the target application is a visual user interface builder, the converter component 810 can reformat the model representation and generate Extensible Application Markup Language (XAML) or another markup language. In a further non-limiting example, if the target application is a graphical application programming interface, converter component 810 can generate C# code or another type of code.

Figure 9:
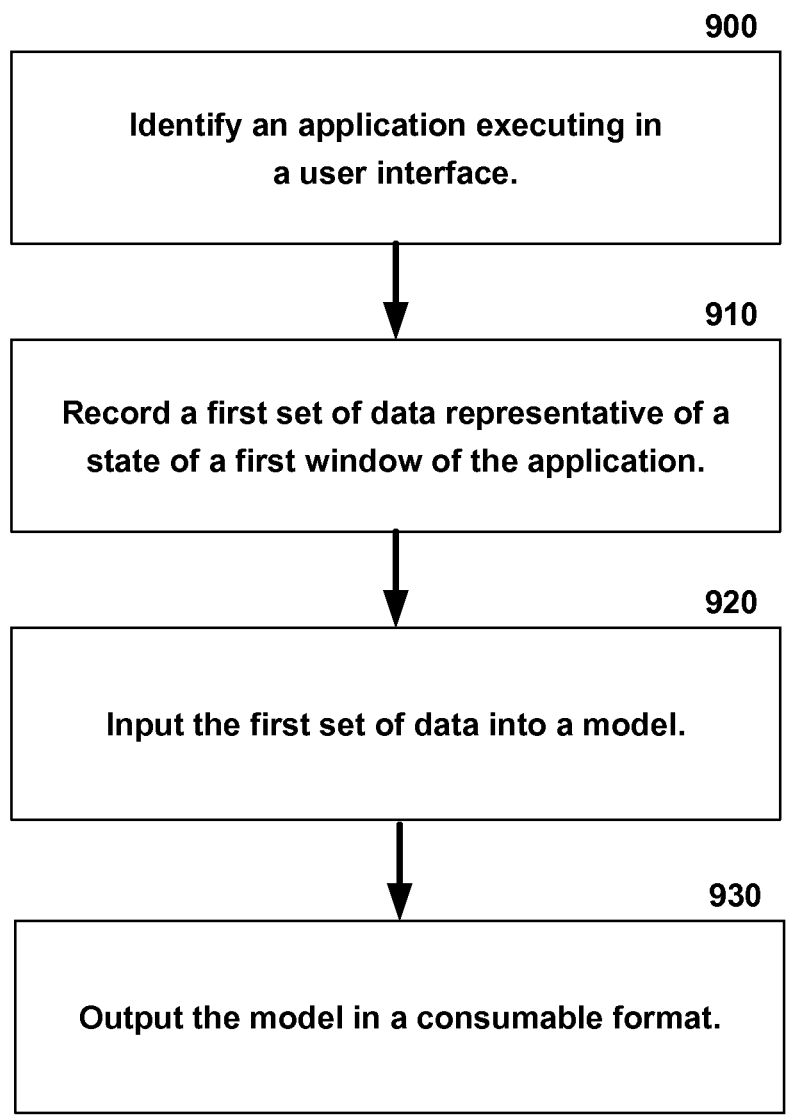
FIG. 9 is a flow diagram illustrating an exemplary non-liming process for creating a mockup of a user interface.

FIG. 9 is a flow diagram illustrating an exemplary non-liming process for creating a mockup of a user interface. At 900, an application executing within the user interface of an application, web site, and so forth is identified. The identification can be based on a received gesture or other indication that a mockup of the application is to be initiated. At 910, a first set of data representative of a state of a first window of the application is recorded. At 920, the first set of data is input into a model. If there are other sets of data gathered (e.g., a second set representing a flow, a third set representing a second window, and so forth), the other sets of data are combined with the first set of data for output as the representative model. At 930, the model is output as a mockup or other representation in a consumable format.

Figure 10:
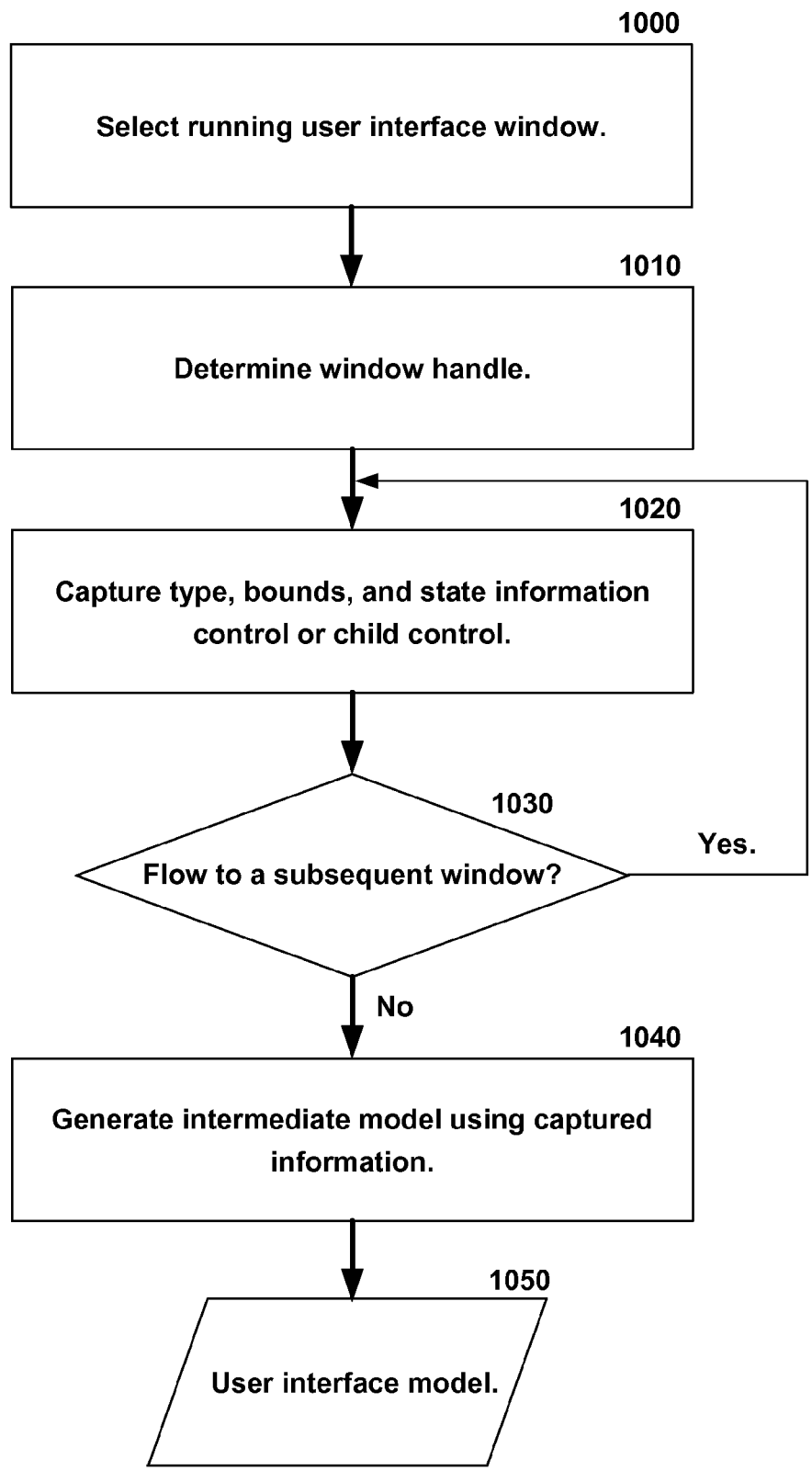
FIG. 10 is a flow diagram illustrating an exemplary non-limiting process for capturing a user interface model.

FIG. 10 is a flow diagram illustrating an exemplary non-limiting process for capturing a user interface model. At 1000, an executing user interface window is selected. The selection can be received from a user that desires to capture a mockup for an existing application. For instance, a selection of an application and a first window (e.g., the executing user interface window) can be received, wherein the first window and the application are currently executing within the user interface. At 1010, a handle or a reference for the first window is determined At 1020, at least one of a type, a bound, a state of a control or its child controls, or combinations thereof is captured or recorded. In an embodiment, the type, bounds, and state of the control or its child controls can be recorded as a first set of data. In a further embodiment, additional information can be obtained though utilization of accessibility application programming interfaces that access one or more control libraries. Child controls associated with the first window are also captured.

A determination is made, at 1030, whether there is execution (e.g., navigation to, launching of, and so on) of at least a second window. If there is execution of a second (or subsequent) window ("YES"), at least one of a type, a bound, a state of control or its child controls, or combinations thereof is captured for each subsequent window. For instance, a transition from the first window (e.g., window initially selected) to a second window (e.g., a first child control) is captured as a second set of data. Transitions to subsequent windows can also be captured as subsequent sets of data.

If the determination, at 1030, is that there is no flow to a second window or no flows to subsequent windows ("NO"), at 1040, an intermediate model is generated using the captured information. For example, a first set of data and a second set of data (as well as subsequent sets of data) are applied to the model. The result is a user interface model 1050.

Figure 11:
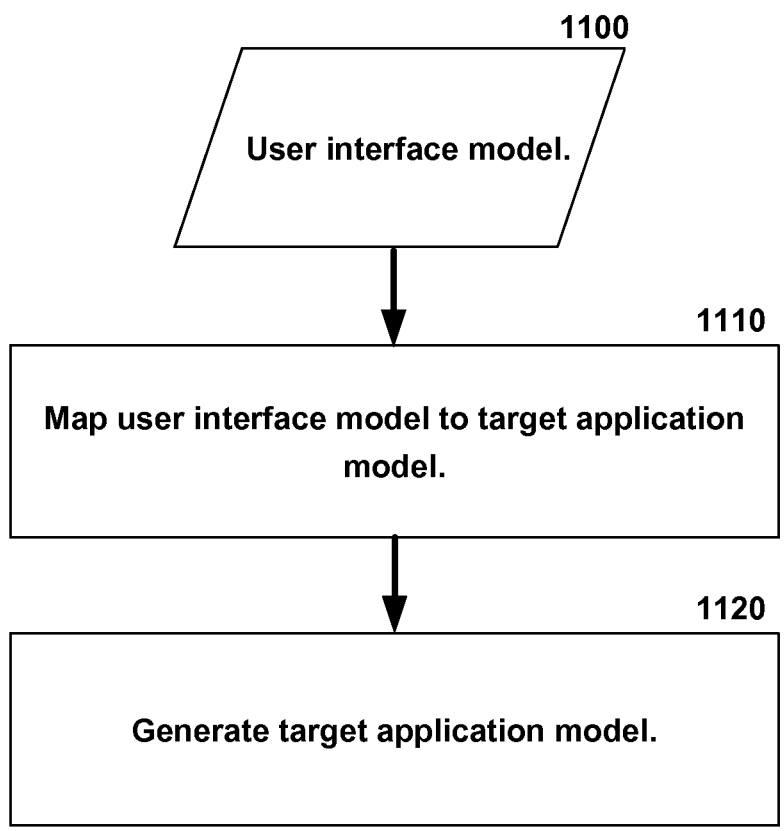
FIG. 11 is a flow diagram illustrating an exemplary non-limiting process for converting a user interface model to a target model.

FIG. 11 is a flow diagram illustrating an exemplary non-limiting process for converting a user interface model to a target model. A user interface model 1100 is constructed as described with reference to the above embodiments. At 1110, the user interface model is mapped to a target application model. At 1120, the target application model is generated and can be rendered in any perceivable format. Thus, a mockup for an existing application has been created. In an embodiment, the model is output in a consumable format. In another embodiment, the model is output in a modifiable digital format.

In an example, a first set of data for a first window is captured and a second set of data representative of a flow from the first window to at least a second window is captured. Further, a third set of data representative of the state of the second window is captured. The first set of data, the second set of data, and the third set of data are input into the model and the model is output in a consumable format.

In another embodiment, a navigation that details a movement from the first window to a subsequent window is created. Further, a first state for the first window and a second state for the second window is retained. The first state, the second state, and the navigation details are sent to the model, wherein the first state, the second state, and the navigation details are output in a format compatible with a target application.

Exemplary Networked and Distributed Environments

One of ordinary skill in the art can appreciate that the various embodiments of the reverse engineering mockup systems and methods described herein can be implemented in connection with any computer or other client or server device, which can be deployed as part of a computer network or in a distributed computing environment, and can be connected to any kind of data store. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in the reverse engineering mockup mechanisms as described for various embodiments of the subject disclosure.

Figure 12:
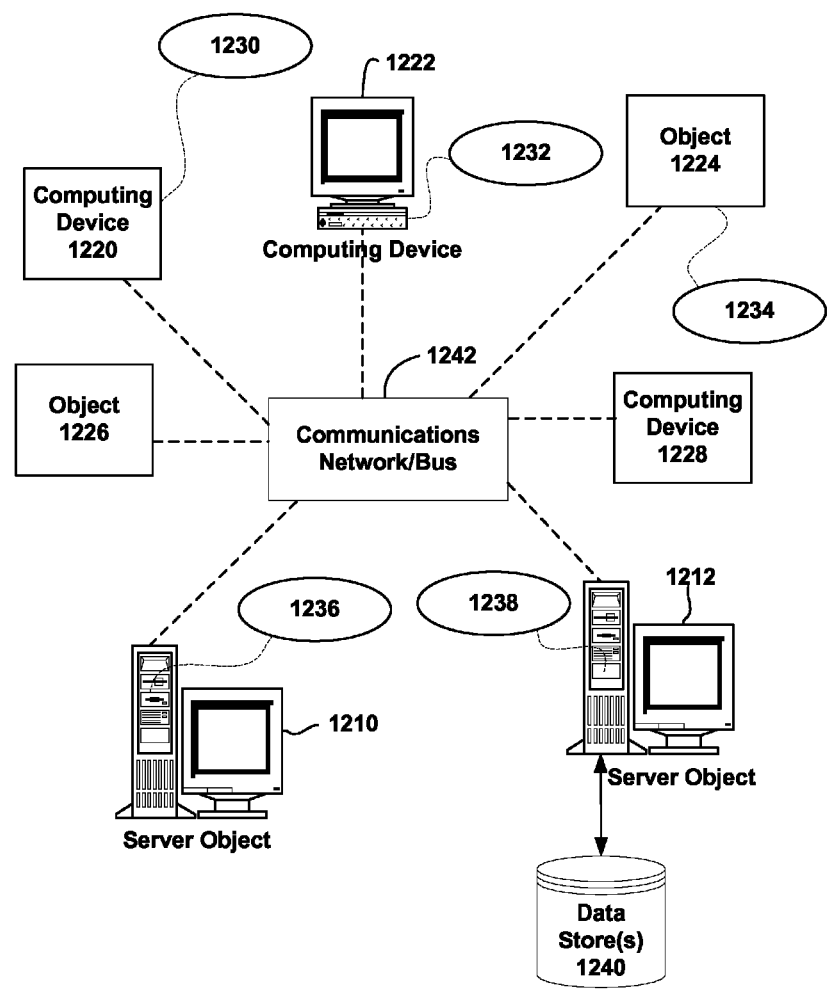
FIG. 12 is a block diagram representing exemplary non-limiting networked environments in which various embodiments described herein can be implemented.

FIG. 12 provides a schematic diagram of an exemplary networked or distributed computing environment. The distributed computing environment comprises computing objects 1210, 1212, etc. and computing objects or devices 1220, 1222, 1224, 1226, 1228, etc., which may include programs, methods, data stores, programmable logic, etc., as represented by applications 1230, 1232, 1234, 1236, 1238 and data store(s) 1240. It can be appreciated that computing objects 1210, 1212, etc. and computing objects or devices 1220, 1222, 1224, 1226, 1228, etc. may comprise different devices, such as personal digital assistants (PDAs), audio/video devices, mobile phones, MP3 players, personal computers, laptops, etc.

Each computing object 1210, 1212, etc. and computing objects or devices 1220, 1222, 1224, 1226, 1228, etc. can communicate with one or more other computing objects 1210, 1212, etc. and computing objects or devices 1220, 1222, 1224, 1226, 1228, etc. by way of the communications network 1242, either directly or indirectly. Even though illustrated as a single element in FIG. 12, communications network 1242 may comprise other computing objects and computing devices that provide services to the system of FIG. 12, and/or may represent multiple interconnected networks, which are not shown. Each computing object 1210, 1212, etc. or computing object or device 1220, 1222, 1224, 1226, 1228, etc. can also contain an application, such as applications 1230, 1232, 1234, 1236, 1238, that might make use of an API, or other object, software, firmware and/or hardware, suitable for communication with or implementation of the reverse engineering mockup techniques provided in accordance with various embodiments of the subject disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the reverse engineering mockup systems as described in various embodiments.

Thus, a host of network topologies and network infrastructures, such as client/server, peer-to-peer, or hybrid architectures, can be utilized. The "client" is a member of a class or group that uses the services of another class or group to which it is not related. A client can be a process, i.e., roughly a set of instructions or tasks, that requests a service provided by another program or process. The client process utilizes the requested service without having to "know" any working details about the other program or the service itself.

In a client/server architecture, particularly a networked system, a client is usually a computer that accesses shared network resources provided by another computer, e.g., a server. In the illustration of FIG. 12, as a non-limiting example, computing objects or devices 1220, 1222, 1224, 1226, 1228, etc. can be thought of as clients and computing objects 1210, 1212, etc. can be thought of as servers where computing objects 1210, 1212, etc., acting as servers provide data services, such as receiving data from client computing objects or devices 1220, 1222, 1224, 1226, 1228, etc., storing of data, processing of data, transmitting data to client computing objects or devices 1220, 1222, 1224, 1226, 1228, etc., although any computer can be considered a client, a server, or both, depending on the circumstances.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the techniques described herein can be provided standalone, or distributed across multiple computing devices or objects.

In a network environment in which the communications network 1242 or bus is the Internet, for example, the computing objects 1210, 1212, etc. can be Web servers with which other computing objects or devices 1220, 1222, 1224, 1226, 1228, etc. communicate via any of a number of known protocols, such as the hypertext transfer protocol (HTTP). Computing objects 1210, 1212, etc. acting as servers may also serve as clients, e.g., computing objects or devices 1220, 1222, 1224, 1226, 1228, etc., as may be characteristic of a distributed computing environment.

Exemplary Computing Device

As mentioned, advantageously, the techniques described herein can be applied to any device where it is desirable to perform reverse engineering of user interface mockups in a computing system. It can be understood, therefore, that handheld, portable and other computing devices and computing objects of all kinds are contemplated for use in connection with the various embodiments, i.e., anywhere that resource usage of a device may be desirably optimized. Accordingly, the below general purpose remote computer described below in FIG. 13 is but one example of a computing device.

Although not required, embodiments can partly be implemented via an operating system, for use by a developer of services for a device or object, and/or included within application software that operates to perform one or more functional aspects of the various embodiments described herein. Software may be described in the general context of computer-executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol should be considered limiting.

Figure 13:
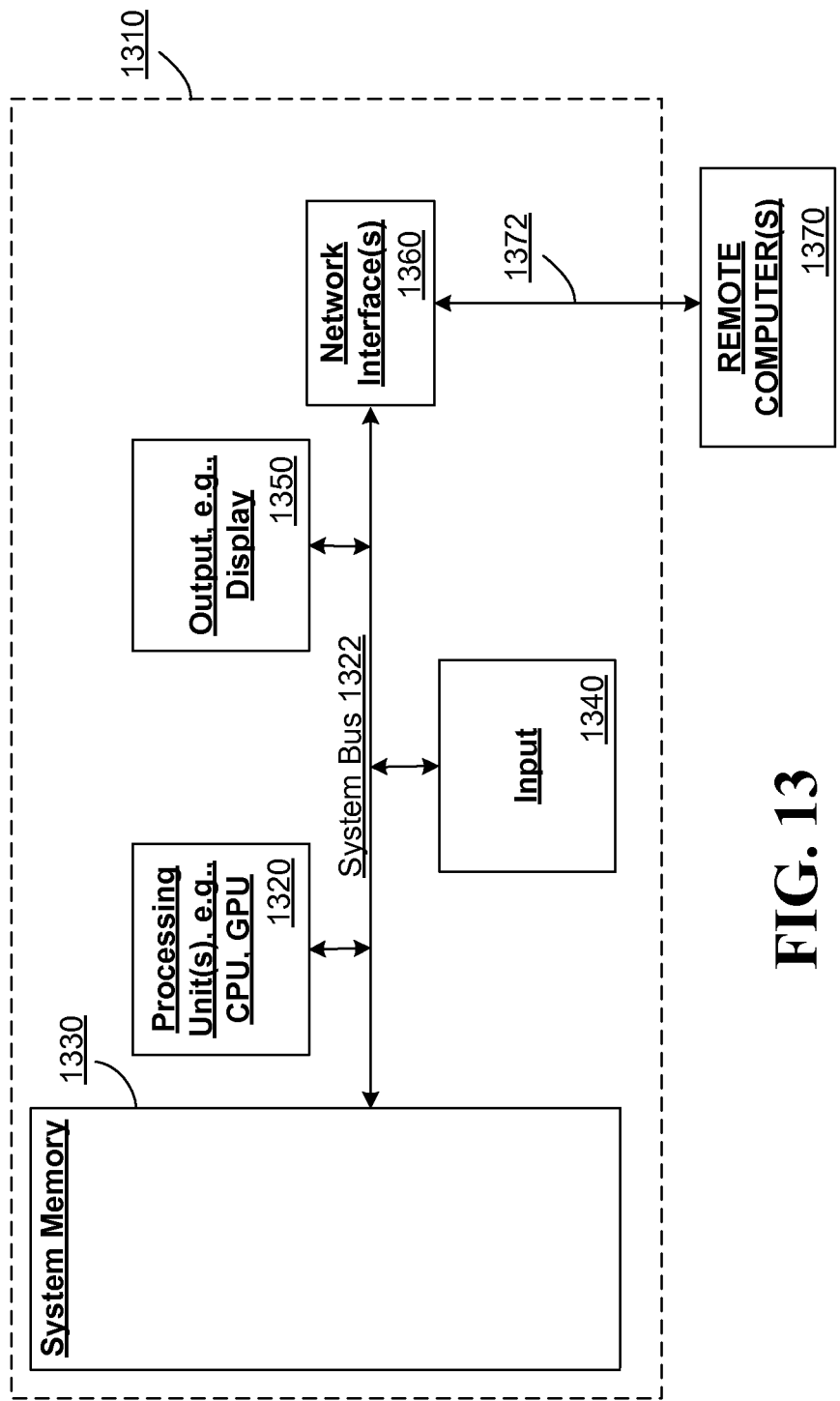
FIG. 13 is a block diagram representing an exemplary non-limiting computing system or operating environment in which one or more aspects of various embodiments described herein can be implemented.

FIG. 13 thus illustrates an example of a suitable computing system environment 1300 in which one or aspects of the embodiments described herein can be implemented, although as made clear above, the computing system environment 1300 is only one example of a suitable computing environment and is not intended to suggest any limitation as to scope of use or functionality. Neither should the computing system environment 1300 be interpreted as having any dependency or requirement relating to any one or combination of components illustrated in the exemplary computing system environment 1300.

With reference to FIG. 13, an exemplary remote device for implementing one or more embodiments includes a general purpose computing device in the form of a computer 1310. Components of computer 1310 may include, but are not limited to, a processing unit 1320, a system memory 1330, and a system bus 1322 that couples various system components including the system memory to the processing unit 1320.

Computer 1310 typically includes a variety of computer readable media and can be any available media that can be accessed by computer 1310. The system memory 1330 may include computer storage media in the form of volatile and/or nonvolatile memory such as read only memory (ROM) and/or random access memory (RAM). By way of example, and not limitation, system memory 1330 may also include an operating system, application programs, other program modules, and program data. According to a further example, computer 1310 can also include a variety of other media (not shown), which can include, without limitation, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information.

A user can enter commands and information into the computer 1310 through input devices 1340. A monitor or other type of display device is also connected to the system bus 1322 via an interface, such as output interface 1350. In addition to a monitor, computers can also include other peripheral output devices such as speakers and a printer, which may be connected through output interface 1350.

The computer 1310 may operate in a networked or distributed environment using logical connections, such as network interfaces 1360, to one or more other remote computers, such as remote computer 1370. The remote computer 1370 may be a personal computer, a server, a router, a network PC, a peer device or other common network node, or any other remote media consumption or transmission device, and may include any or all of the elements described above relative to the computer 1310. The logical connections depicted in FIG. 13 include a network 1372, such local area network (LAN) or a wide area network (WAN), but may also include other networks/buses. Such networking environments are commonplace in homes, offices, enterprise-wide computer networks, intranets and the Internet.

As mentioned above, while exemplary embodiments have been described in connection with various computing devices and network architectures, the underlying concepts may be applied to any network system and any computing device or system.

Also, there are multiple ways to implement the same or similar functionality, e.g., an appropriate API, tool kit, driver code, operating system, control, standalone or downloadable software object, etc. which enables applications and services to take advantage of the techniques provided herein. Thus, embodiments herein are contemplated from the standpoint of an API (or other software object), as well as from a software or hardware object that implements one or more embodiments as described herein. Thus, various embodiments described herein can have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used, for the avoidance of doubt, such terms are intended to be inclusive in a manner similar to the term "comprising" as an open transition word without precluding any additional or other elements.

As mentioned, the various techniques described herein may be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described supra, methodologies that may be implemented in accordance with the described subject matter can also be appreciated with reference to the flowcharts of the various figures. While for purposes of simplicity of explanation, the methodologies are shown and described as a series of blocks, it is to be understood and appreciated that the various embodiments are not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

In addition to the various embodiments described herein, it is to be understood that other similar embodiments can be used or modifications and additions can be made to the described embodiment(s) for performing the same or equivalent function of the corresponding embodiment(s) without deviating there from. Still further, multiple processing chips or multiple devices can share the performance of one or more functions described herein, and similarly, storage can be effected across a plurality of devices. Accordingly, the invention should not be limited to any single embodiment, but rather should be construed in breadth, spirit and scope in accordance with the appended claims.

What is claimed is:

1. A method executed by at least one central processing unit for creating a model of a user interface, comprising:
   identifying an application within the user interface from a plurality of applications for which the model is to be created;
   recording a first set of data representative of a state of a first interface window of the application wherein the first set of data is one of a plurality of states that comprises a series of progressions between a plurality of windows to a second interface window and interaction details associated with the series of progressions, wherein each of the plurality of windows is a distinct window accessed during the series of progressions between the plurality of states;
   inputting the first set of data into the model;
   creating a navigation that details a movement from the first interface window to a subsequent interface window, the subsequent interface window distinct from the first window;
   retaining a first state for the first interface window and a second state for the subsequent interface window; and
   sending the first state and the second state to the model, wherein the first state and the second state are output in a format compatible with a target application; and
   outputting the model in a consumable format.

2. The method of claim 1, wherein the identifying comprising:
   receiving a selection of the application and the first interface window, wherein the first interface window and the application are currently executing within the user interface; and
   determining a reference for the first interface window.

3. The method of claim 1, wherein the recording comprises recording at least one of a type, a bound, a state of a control and its child controls.

4. The method of claim 1, wherein the recording comprises utilizing accessibility application programming interfaces to capture information related to the first set of data.

5. The method of claim 1, further comprising:
   capturing a second set of data representative of a transition from the first interface window to at least the second interface window the at least second window distinct from the first window; and
   applying the second set of data to the model, wherein the outputting comprises outputting the model that comprises the first set of data and the second set of data in the consumable format.

6. The method of claim 1, further comprising:
   capturing a second set of data representative of a flow from the first interface window to at least the second window, wherein in the at least second interface window is distinct from the first window;
   obtaining a third set of data representative of the state of the at least the second window; and
   inputting the first set of data, the second set of data, and the third set of data into the model before the outputting.

7. The method of claim 1, further comprising:
   generating an intermediate model using the first set of data before the outputting.

8. The method of claim 1, wherein the outputting comprises:
   mapping the model to a target application model;
   generating the target application model; and
   rendering the target application model.

9. The method of claim 1, wherein the outputting comprises outputting the model in a modifiable and consumable digital format.

10. A method executed by at least one central processing unit, for reverse engineering a user interface mockup, comprising:
    receiving a selection of an executing user interface window of an application or a web site for which a mockup is to be created;
    capturing interaction details of a progression from the executing user interface window to a subsequent interface window, wherein a plurality of intermediate windows are accessed during the progression from the executing user interface window to the subsequent interface window and wherein at least one of the plurality of intermediate windows is a second application that is opened in response to the interaction details;
    recording a plurality of states, wherein the plurality of states comprise a state for the executing user interface window, the subsequent interface window, and the plurality of intermediate windows and wherein the executing user interface window, the subsequent interface window and the plurality of intermediate windows are distinct windows;
    generating a model that comprises the interaction details and the plurality of states;

mapping the model to a target application model; and rendering the target application model as a modifiable mockup for a modified version of the application or the web site.

11. A reverse engineering mockup system, comprising:

at least one central processing unit;

a gesture component configured to receive a selection of the target application from a plurality of applications currently operating;

an introspection manager component configured to capture a plurality of states associated with a plurality of user interface (UI) control hierarchies of a target application;

a tracking component configured to monitor a progression between a plurality of screens of the target application, wherein at least a portion of the plurality of screens are intermediate screens accessed during the progression from a first screen to a second screen and wherein the plurality of screens are distinct screens from each other;

a navigation component configured to generate links that represent the progression between the plurality of screens;

a mockup processing component configured to generate a model representation based on the plurality of states wherein the plurality of states comprises a state for each of the plurality of screens in the progression; and an output component configured to render the model representation in an editable format.

12. The reverse engineering mockup system of claim 11, further comprising:

an observation component configured to obtain a first state of a first window of the target application and a second state of a second window, wherein the second window is activated by an action in the first window; and a storyboard manager component configured to access the plurality of UI control hierarchies and associated information, wherein the mockup processing component is further configured to serialize the plurality of UI control hierarchies and the associated information into the model representation.

13. The reverse engineering mockup system of claim 11, further comprising:

a converter component configured to convert the model representation into a format compatible with the target application, wherein the output component is further configured to convey the model representation in the format compatible with the target application for use as a mockup.

14. The reverse engineering mockup system of claim 11, wherein the introspection manager component is further configured to capture a control concept, wherein the control concept is associated with one of the plurality of states.

15. The reverse engineering mockup system of claim 11, wherein the mockup processing component is further configured to retain the model representation as an intermediate model for later conversion into a format compatible with the target application.

16. The reverse engineering mockup system of claim 11, further comprising a gesture component configured to identify a selection of the target application as a function of a gesture that identifies the target application and a first application window of the target application.

17. The reverse engineering mockup system of claim 11, wherein the introspection manager component is further configured to capture at least one of a type of an application, a bound of the application, a state of a control or its child controls.

18. The reverse engineering mockup system of claim 11, wherein the introspection manager component utilizes an accessibility application programming interface.

* * * * *